United States Patent
Neal

(12) United States Patent (10) Patent No.: US 8,151,756 B2
Neal (45) Date of Patent: Apr. 10, 2012

(54) ENGINE BALANCE SHAFT HOUSING AND METHOD OF ASSEMBLING SAME

(75) Inventor: Timothy L. Neal, Ortonville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 789 days.

(21) Appl. No.: 12/332,399

(22) Filed: Dec. 11, 2008

(65) Prior Publication Data

US 2010/0147248 A1    Jun. 17, 2010

(51) Int. Cl.
*F02B 75/06* (2006.01)
*F16C 3/04* (2006.01)
*B21K 3/00* (2006.01)
(52) U.S. Cl. ............... 123/192.2; 74/603; 29/888.01
(58) Field of Classification Search ............... 123/192.2; 74/603; 29/428, 888.01
See application file for complete search history.

(56) References Cited

U.S. PATENT DOCUMENTS 6,371,071 B1    4/2002    Iwata
6,471,008 B1    10/2002    Iwata

FOREIGN PATENT DOCUMENTS

JP        2006329064 A      12/2006
WO      WO 00/00726          1/2000

*Primary Examiner* — Noah Kamen
(74) *Attorney, Agent, or Firm* — Quinn Law Group, PLLC

(57) ABSTRACT

A balance shaft housing is provided that includes a first housing portion, a second housing portion operatively connected to the first housing portion, with the first housing and the second housing configured to cooperatively define first and second balance shaft chambers. A cover member is secured to the second housing portion and cooperates with the first and second housing portions to define an air flow path outside of the chambers for circulating air to the balance shaft chambers. A method of assembling a balance shaft housing is also provided.

16 Claims, 2 Drawing Sheets

ENGINE BALANCE SHAFT HOUSING AND METHOD OF ASSEMBLING SAME

TECHNICAL FIELD

The invention relates to a balance shaft housing for an engine.

BACKGROUND OF THE INVENTION

Engines are often equipped with balance shafts rotatably connected to and parallel with the engine crankshaft via a chain and sprocket or a gear train. The balance shafts have counterweights that help to counter vibrational forces created by engine pistons which rotate the crankshaft. The balance shafts are typically housed in the oil pan connected to the engine block. A balance shaft housing surrounds the balance shafts within the oil pan to minimize contact of the rotating countershafts with the oil. When the engine is off for an extended period of time, the housing tends to fill with oil contained within the oil pan. When the engine is started, and the balance transfer shafts begin rotating, oil collected within the housing around the balance shafts must be expelled in order to reduce oil aeration and losses due to resistance to rotation. A balance shaft housing that affords expedient expulsion of oil while being easy to assemble and of relatively low cost is desired.

SUMMARY OF THE INVENTION

A balance shaft housing is provided that includes a first housing portion, a second housing portion operatively connected to the first housing portion, with the first housing portion and the second housing portion configured to cooperatively define first and second balance shaft chambers. A cover member is secured to the second housing portion and cooperates with the first and second housing portions to define an air inlet passage, partially defining an air flow path, outside of the chambers for circulating air to the balance shaft chambers. The cover member may be sheet metal, with openings aligned with extensions of the second housing that are deformed to secure the member to the second housing portion.

The cover member serves to further complete the air flow path through the housing portions that allows air to be efficiently pulled into the housing portion when the balance shafts rotate, to expel oil from within the chambers. By utilizing the cover member, the housing portions remain relatively simple shapes that may be die cast without die lockup, and without requiring intricate die tools to form the flow passage. Furthermore, the cover member may be a lightweight sheet metal, minimizing added weight and boosting fuel economy as compared with utilizing heavier iron to form the portion of the flow path completed by the cover member. No portions of the air flow path through the housing needs to be drilled or cored, reducing manufacturing costs.

The first housing portion defines an entrance to the air inlet passage, with the entrance being above a predetermined oil level in the oil pan at which oil is expected to be maintained. The lower housing portion defines a first and a second chamber entrance port fluidly connecting the air inlet passage with the first and the second balance shaft chambers, respectively. The second housing portion defines first and second chamber exit ports fluidly connecting the chambers with the surrounding oil pan, preferably above a predetermined oil level within the pan.

The first and the second balance shafts each include at least one respective counterweight positioned within the respective balance shaft chamber. The respective balance shafts rotate in opposing directions from the respective entrance port inward toward the air inlet passage to push fluid from the respective chamber entrance ports toward the air inlet passage and to expel the fluid through the first and second exit ports.

A method of assembling a balance shaft housing includes casting a first housing portion, and casting a second housing portion. The cast first and second housing portions are configured to define first and second balance shaft chambers when placed together, with an air inlet passage extending through the housing portions between the balance shaft chambers. A sheet member is then secured to the second housing portion to further define an air inlet flow path from the air inlet passage to a cavity defined between the second housing portion and the sheet member. Securing of the sheet member may include deforming extensions of the second housing portion to secure the sheet member to the second housing portion with the deformed extensions. The method may include sealing the sheet member to the second housing portion prior to securing the sheet member to the second housing portion.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
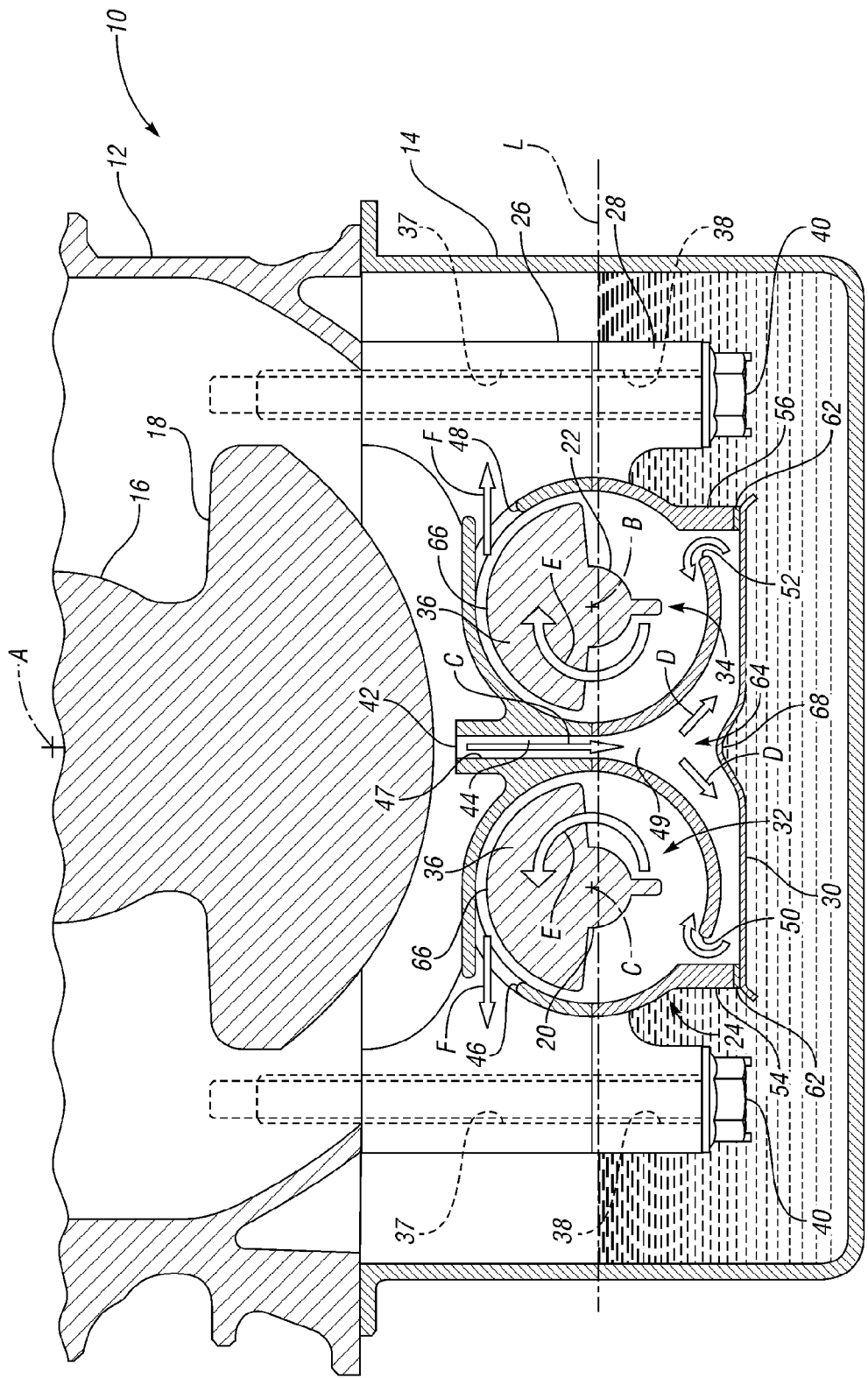
FIG. 1 is a fragmentary cross-sectional schematic view of an engine assembly with a balance shaft housing having a cover member.

Referring to the drawings, wherein like reference numbers refer to like components throughout the several views, FIG. 1 shows an engine assembly 10 that includes an engine block 12 with an oil pan 14 secured thereto by bolts, fasteners, or other known means. A crankshaft 16 rotatable about an axis of rotation A includes multiple counterweights 18 (one shown). First and second balance transfer shafts 20, 22 are operatively connected for rotation about respective axes B, C relative to the crankshaft 16, by a gearing arrangement or otherwise.

The balance transfer shafts 20, 22 are housed within a balance transfer housing 24 that has a first housing portion 26, a second housing portion 28, and a cover member 30. The first and second housing portions 26, 28 are each unitary, die cast aluminum alloy components. The first housing portion 26 is formed with fastener openings 37 that align with fastener openings 38 cast into the second housing portion 28. Bolts 40 are inserted through the aligned openings and into threaded bores in the engine block 12 to secure the housing portions 26, 28 to the engine block 12. When the first housing portion 26 is positioned between the second housing portion 28 and the engine block 12, and the second housing portion 28 is positioned between the first housing portion 26 and the oil pan 14, the housing portions 26, 28 are configured to cooperatively define first and second balance shaft chambers 32, 34. The balance shafts 20, 22 are centered within the chambers 32, 34, with the chambers 32, 34 sized to allow counterweights 36 of the balance shafts 20, 22 to rotate with the balance shafts 20, 22 therein.

When mounted to the engine block 12 with the bolts 40, the balance shaft housing 24 is positioned with the second housing portion 28 substantially submerged in oil that sits in the oil pan 14 at a predetermined operating level L. The first housing portion 26 is substantially above the oil level L and is cast with an air entrance or air inlet 42 leading to an air inlet or air passage 44, formed in part by the first housing portion 26 and in part by the second housing portion 28, that passes all the way through the first and second housing portions 26, 28 to the oil pan. The air inlet passage 44 is cast into both of the housing portions 26, 28, by casting the first housing portion 26 with a first passage 47 and casting the second housing portion 28 with a second passage 49 that aligns with the first passage 47 when the first and second housing portions 26, 28 are secured to the engine block 12. Thus, the first housing portion 26 may be referred to as an upper housing portion, and the second housing portion 28 may be referred to as a lower housing portion. The first housing portion 26 is also cast with a first chamber exit port 46 and a second chamber exit port 48. Multiple passages 47, 49 may be cast along a length of the balance shaft housing 24 (i.e., along an axis perpendicular to the cross-section of FIG. 1) and multiple exit ports 46, 48 may be cast along the length as well. The first housing portion 26 is cast as a single, unitary component.

The second housing portion 28 is cast with a first inlet port 50 and a second inlet port 52. The first inlet port 50 establishes fluid communication between an area outside of the first balance shaft chamber 32 and the balance shaft chamber 32. The second inlet port 52 establishes fluid communication between an area outside of the second balance shaft chamber 34 and the balance shaft chamber 34. Multiple inlet ports 50, 52 may be cast along a length of the balance shaft housing 24. The second housing portion 28 is also cast with legs 54, 56 that extend outward from the balance shaft chambers 32, 34 with the inlet ports 50, 52 being between the legs 54, 56. The second housing portion 28 is cast as a single, unitary component.

Figure 2:
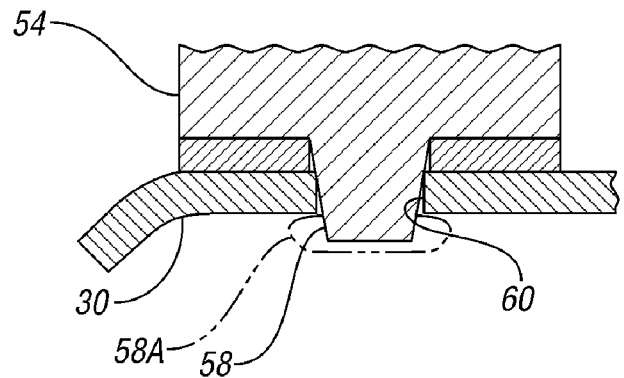
FIG. 2 is a cross-sectional view of a portion of the balance shaft housing of FIG. 1.

In order to separate the area between the air inlet passage 44 and the inlet ports 50, 52 from the remainder of area enclosed by the oil pan 14, the cover member 30, in the form of a sheet metal plate, is secured to the legs 54, 56 of the second housing portion 28. Referring to FIG. 2, a portion of the leg 54 with the cover member 30 secured thereto is shown in greater detail. The cover member 30 is also secured to the leg 56 in like manner. Specifically, the legs 54, 56 are formed with deformable extensions 58 at a terminal portion thereof. The deformable extensions 58 align with openings 60 formed in the cover member 30. Although only one deformable extension 58 and one opening 60 is shown, multiple deformable extensions 58 are spaced along a length of the legs 54, 56 (i.e., perpendicular to the cross section shown in FIGS. 1 and 2) and multiple openings 60 are also spaced along the length of the cover member 30 to align with the deformable extensions 58 on both legs 54, 56. Seal members 62 are placed along both legs 54, 56 to seal the interface between the legs 54, 56 and the cover member 30. The seal members 62 may also be formed with openings that align with the extensions 58 so that the extensions 58 extend through the seal members 62, or alternative seal members may be provided that are placed only outward of the extensions 58. The seal members 62 may be a room temperature vulcanization material, or other known material compatible with engine oil. As shown in FIG. 2, the deformable extensions 58 are deformed with a tool after insertion through the openings 60, to a deformed state 58A, shown only in phantom, in which the cover member 30 is retained to the housing portion 28 by interference of the extensions in the deformed state 58A with the openings 60.

By use of the cover member 30 secured to the second housing portion 28, an area 64 below the air inlet passage 44 in FIG. 1 and between the air inlet ports 50, 52 is enclosed. This enclosure could not be achieved by casting an enclosure as an integral part of the second housing portions 28 without resorting to much more complex and costly die tooling to create the lower housing portion 28. As is apparent to those skilled in the art, the geometry of both the first and the second housing portions 26, 28 allow these components to be cast with simple upper and lower dies without causing die lock.

With the balance shaft housing 28 assembled as shown in FIG. 1, the balance shaft chambers 32, 34 can be efficiently emptied of excess oil upon engine startup while minimizing aeration of the oil in the oil pan 14. After a period of non-use of the engine, drain back of lubricating and cooling oil will occur, and the oil level in the oil pan 14 will be higher than the operating oil level L. The outlet ports 46, 48 will be partially or entirely covered with oil under such conditions. The air entrance 42 to the air inlet passage 47 is the highest portion of the installed housing 24, so that air with minimal entrained oil is likely to be pulled into the air inlet passage 44 upon engine startup. With the crankshaft 16 rotating, the balance shafts 20, 22 are made to rotate in opposing directions, with balance shaft 20 rotating counter-clockwise from the perspective shown in FIG. 1, with balance shaft 22 rotating clockwise. Thus, both balance shafts 20, 22 rotate so that air will be pulled from the air inlet passage 44 through the area 64 and the inlet ports 50, 52 toward the center of the housing 28 (i.e., toward the passage 44 within the chambers 32, 34, and then out through the exit ports 46, 48 into the pan 14). Oil level in the space in the pan 14 outside of the chambers 32, 34 and surrounding the housing 24 will drain down to operating level L, so that the exit ports 46, 48 will quickly be uncovered, if they were initially covered, allowing expulsion of the chambers 32, 34 without substantial back pressure.

The first and second chamber exit ports 46, 48 are configured to align with a peripheral edge 66 of each counterweight 36 as it reaches the position shown in FIG. 1, so that oil in an upper region of the respective chambers 32, 34 above the counterweights 36 can be expelled from the first and second balance shaft chambers 32, 34, as described below. Thus, an air flow path is shown by the path of arrows C, D, E and F (with arrow E also indicating the direction of rotation of the respective balance transfer shafts). The cover member 30 is formed with a detent or ridge 68 to encourage the air flow to separate at arrows D toward both of the inlet ports 50, 52.

Figure 3:
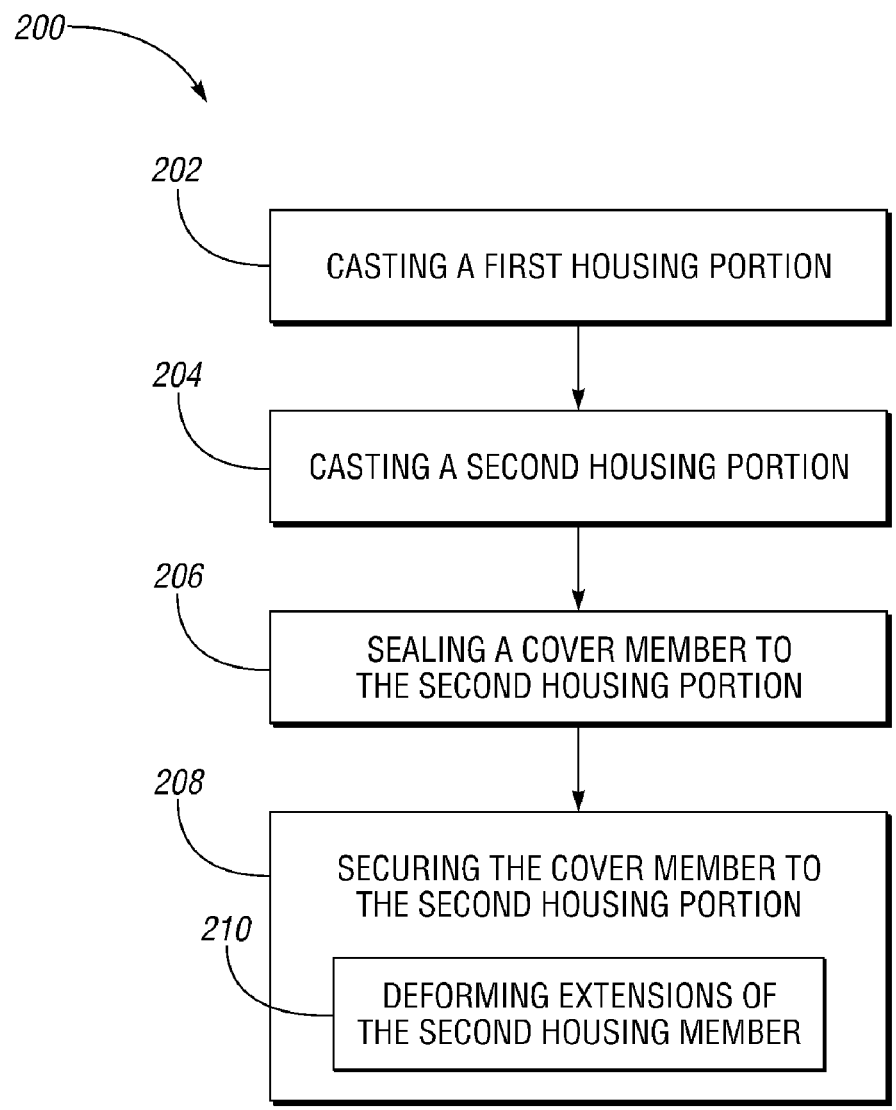
FIG. 3 is a flow diagram illustrating a method of assembling the balance shaft housing of FIGS. 1 and 2.

Referring to FIG. 3, a flow diagram illustrating a method 200 of assembling a balance shaft housing 24 is described with respect to the structure of FIGS. 1 and 2. The method 200 includes casting 202 a first housing portion 26 and also casting 204 a second housing portion 28. The cast first and second housing portions 26, 28 define first and second balance shaft chambers 32, 34 therebetween when placed together, with an air inlet passage 44 extending through the housing portions 26, 28 between the balance shaft chambers 32, 34. The method further includes securing 208 a sheet member 30 to the second housing portion 28 to further define the air inlet passage 44 and enclose a cavity 64 defined between the second housing portion 28 and the sheet member 30. The first housing portion 26 is cast with a respective outlet port 46, 48 at the first and second balance shaft chambers 32, 34, and the second housing portion 28 is cast with a respective inlet port 50, 52 at the first and second balance shaft chambers 32, 34 in fluid communication with the cavity 64. Securing 208 of the cover member 30 may include deforming 210 extensions 58 of the second housing portion 28 to secure the cover member 30 to the second housing portion 26 with the deformed extensions 58A. The method may include sealing 206 the cover member 30 to the second housing portion 28 prior to securing the cover member 30 to the second housing portion 28. In light of the placement of the inlet passage 44, the cover member 30, chamber inlet ports 50, 52 and chamber outlet ports 46, 48, no coring or drilling is required to form the housing 24, and air flows naturally from the inlet passage 44, through the chambers 32, 34, and out of the outlet ports 46, 48 when the balance transfer shafts 20, 22 rotate within the chambers 32, 34 thus quickly expelling oil from the chambers 32, 34 without excessive resistance.

While the best modes for carrying out the invention have been described in detail, those familiar with the art to which this invention relates will recognize various alternative designs and embodiments for practicing the invention within the scope of the appended claims.

The invention claimed is:

1. A balance shaft housing comprising:
    a first housing portion;
    a second housing portion operatively connected to the first housing portion; wherein the first housing portion and the second housing portion are configured to cooperatively define first and second balance shaft chambers; and
    a cover member secured to the second housing portion;
    wherein the cover member is configured to define with the first and second housing portions a portion of an air flow path outside of the balance shaft chambers for circulating air into the balance shaft chambers.

2. The balance shaft housing of claim 1, wherein the first housing portion defines an entrance to the air flow path; wherein the second housing portion defines first and second chamber entrance ports fluidly connecting the air flow path with the first and the second balance shaft chambers, respectively.

3. The balance shaft housing of claim 2, wherein the first housing portion defines first and second chamber exit ports that establish fluid communication between an area surrounding the balance shaft housing and the first and the second balance shaft chambers, respectively.

4. The balance shaft housing of claim 3, wherein the entrance to the air flow path is between the first and second chamber exit ports, and the air flow path passes between the respective balance shaft chambers to communicate with the first and second chamber entrance ports; and further comprising:
    first and second balance shafts each including at least one respective counterweight and each being positioned within the respective first and second balance shaft chambers; and wherein the balance shafts rotate in opposing directions from the respective chamber entrance ports inward toward the air flow path and outward toward the respective exit ports to thereby pull air into the air flow path and through the air inlet ports and expel fluid from the chambers through the first and second exit ports.

5. The balance shaft housing of claim 3, wherein the first and second exit ports are generally aligned with a peripheral edge of the counterweight opposite the second housing portion.

6. The balance shaft housing of claim 1, wherein the second housing portion has deformable extensions extending therefrom; wherein the cover member is a plate having openings alignable with the extensions; and wherein the extensions are deformable to retain the cover member to the second housing member.

7. The balance shaft housing of claim 1, further comprising:
    a seal member between the second housing portion and the cover member.

8. An engine assembly, comprising:
    an engine block;
    an oil pan mounted to the engine block;
    a balance shaft housing mounted to the engine block and disposed within the oil pan; wherein the balance shaft housing includes a first housing portion and a second housing portion each partially defining balance shaft chambers for containing a respective balance shaft, with the first housing portion being between the balance shaft chambers and the engine block and the second housing portion being between the balance shaft chambers and the oil pan; and
    a plate member secured to the second housing portion between the second housing portion and the oil pan to partially define therewith an air flow path extending from an inlet formed by the first housing portion and passing between the balance shaft chambers to first and second inlet ports defined by the second housing portion, thereby establishing fluid communication with the first and the second balance shaft chambers, respectively, and the inlet.

9. The engine assembly of claim 8, wherein the first housing portion defines first and second outlet ports establishing fluid communication with the first and the second balance shaft chambers, respectively, and the oil pan.

10. The engine assembly of claim 9, wherein the inlet and the first and second outlet ports are configured to be above a predetermined operating level of oil in the oil pan.

11. The engine assembly of claim 9, wherein the second housing member has deformable extensions and the sheet member has openings configured to align with the deformable extensions when the sheet member is placed on the second housing portion; and wherein the sheet member is secured to the second housing portion by deformation of the extensions at the openings.

12. The engine assembly of claim 9, further comprising:
    a seal member between the second housing portion and the sheet member to seal the sheet member and the second housing member to one another.

13. A method of assembling a balance shaft housing, comprising:
    casting a first housing portion;
    casting a second housing portion; wherein the cast first and second housing portions define first and second balance shaft chambers therebetween when placed together, with an air inlet passage extending through the housing portions between the balance shaft chambers; and
    securing a cover member to the second housing portion to enclose a cavity defined between the second housing portion and the sheet member open to the air inlet passage.

14. The method of claim 13, wherein the first housing portion is cast with a respective outlet port at the first and second balance shaft chambers; and wherein the second housing portion is cast with a respective inlet port at the first and second balance shaft chambers in fluid communication with the cavity.

15. The method of claim 13, wherein the securing includes deforming extensions of the second housing portion to secure the cover member to the second housing portion with the deformed extensions.

16. The method of claim 13, further comprising:
sealing the cover member to the second housing portion prior to securing the cover member to the second housing portion.

* * * * *